May 22, 1934.                R. H. MILLER                1,959,984
                             STUFFING BOX
                           Filed April 5, 1933
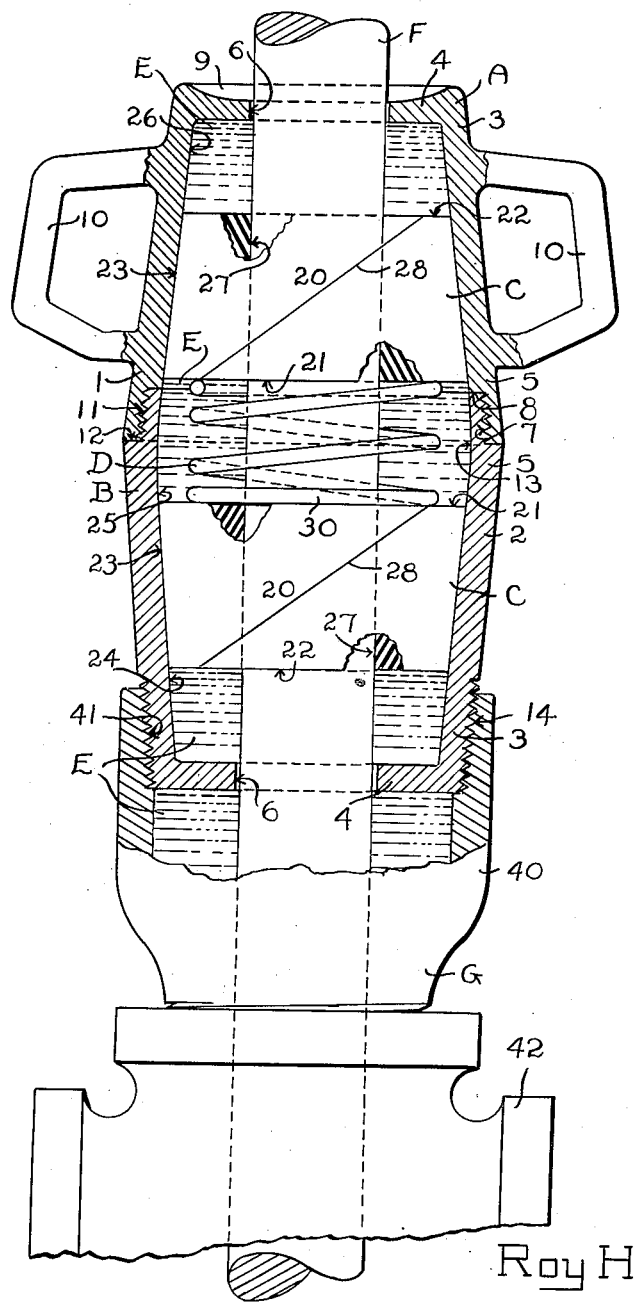
INVENTOR.
Roy H. Miller
BY
Lancaster, Allwine and Rommel
ATTORNEYS.

Patented May 22, 1934

1,959,984

UNITED STATES PATENT OFFICE 1,959,984

STUFFING BOX

Roy Herbert Miller, Avant, Okla., assignor to Phillips Petroleum Company, Bartlesville, Okla., a corporation of Delaware Application April 5, 1933, Serial No. 664,626

5 Claims. (Cl. 286—30)

This invention relates to stuffing boxes and more particularly to such a device provided with a pair of packing units, alternating in compressing and packing off the stuffing box.

The principal object of the invention is to provide a stuffing box which will not require frequent attention and which is so constructed as to prevent burning of the packing units.

Another object is to provide a stuffing box particularly adapted to be employed with oil-pumping equipment and so constructed as to utilize, as a lubricant, a minute portion of the oil being pumped.

Another object is to utilize a portion of the gas pressure built up in the tubing of an oil well wherein, for instance, a pump is being used to agitate the well in order to liberate occluded and dissolved gas, whereby this gas pressure may be employed as an additional force tending to further compress the packing of this novel stuffing box.

Still another object is to provide a stuffing box construction wherein wearing away of the packing units during movement thereof will be minimized.

Another object is to provide an improved stuffing box construction wherein worn-away material from the packing units will be retained by the stuffing box but will not interfere with the efficient operation of the device.

Another object is to provide an improved stuffing box housing comprising but two connected sections and which sections may be inexpensively manufactured, are strong-walled and may be readily disconnected one from the other.

Other objects and advantages of this invention will be apparent during the course of the following detailed description taken in connection with the accompanying drawing, forming a part of this specification, and in which drawing the figure is substantially a vertical cross section of the novel stuffing box.

For the purpose of illustration, in the accompanying drawing, only a preferred embodiment of the invention is shown, and therein the letter A designates generally the improved stuffing box, B the housing therefor, C packing units therefor, D resilient means separating the packing units, E a lubricant, F a member reciprocating thru the stuffing box, and G a support for the stuffing box.

The improved stuffing box A comprises but five parts, three preferably of metal and two of suitable compressible packing material.

The housing B is somewhat barrel-shaped and includes a pair of elongate, frusto-conical sections 1 and 2, each having a smaller end 3 closed by a flat end wall 4 and an open larger end 5 and each section provided with a circular aperture 6 in the end wall 4 to accommodate the reciprocating member F, the walls of these apertures preferably clearing the periphery of the reciprocating member.

The section 1 is provided with interior screw threads 7 ending in a shoulder 8 at its larger end 5 and an outwardly opening sump or depression 9 at its smaller end 3. Suitable handles or grips 10 extend outwardly from the outer surface of the section.

As for the section 2, the same is provided at its larger end 5 with exterior screw threads 11 and an exterior shoulder 12.

By means of the screw threads 7 and 11, the sections 1 and 2 may be detachably coupled together as shown in the drawing, with the extremity of the larger end of the section 1 abutting the shoulder 12 and the extremity of the larger end of the section 2 abutting the shoulder 8. When so assembled a pair of frusto-conical packing-receiving chambers are provided within the housing B which are wholly unobstructed and open to each other at their larger ends. From the figure it will be readily seen that the widest part 13 of the housing is substantially midway the end walls 4 and that the surface of one chamber merges into the surface of the other chamber. In fact, the surfaces of the chambers referred to are preferably smooth and unobstructed in any way, the inner surfaces of the end walls being flat, and it will be noted that the walls of the housing are substantially the same thickness throughout. Exterior screw threads 14 are provided at the smaller end 3 of the section 2 for detachably coupling the housing to a suitable support.

The packing units C comprise a pair of frusto-conical, compressible members 20 provided with flat end faces 21 and 22, the first considerably larger in exterior circumference than the other, and the side faces 23 of the members 20 are provided to normally engage the surfaces of the chambers referred to above. When either of these members 20 are inserted into the chamber within either section 1 or 2, it will normally occupy the intermediate portion of the chamber, with the end face 22 spaced from the wall 4, and the end face 21 spaced from the widest part 13 of the housing. Consequently, it will be seen that three oil or lubricant chambers 24, 25 and 26 are provided, which will again be referred to in detail. Each member 20 is provided with a bore 27 so that the members may encircle the reciprocating member F and the members 20 may be slit, as at 28, an expedient well known in the art so that they may be expeditiously placed about a rod. These members 20 are preferably of rubber.

The resilient means D separating the two packing units C may comprise an expansion coil spring 30, having one end in contact with the larger end face 21 of one packing unit and its other end in contact with the facing larger end face 21 of the other packing unit. The spring, of course, encircles the reciprocating member F, forces the two packing units apart, and may compress to a limited extent at times.

As for the lubricant E, the same preferably comprises the oil or similar fluid being pumped by the apparatus with which the improved stuffing box is associated. A minute volume of this oil will be so required, and with the arrangement shown, no grease cups, lubricant conduits, or the like are required.

In the example shown, the reciprocating member F is a conventional vertically reciprocable polished rod such as is employed in oil well operations.

The support G may be, too, any suitable piece of apparatus, and in the example shown comprises a conventional swedged nipple 40 having screw threads 41 to engage the screw threads 14 of the section 2. This nipple 40 may open into a hollow head 42, thru which the fluid is flowing.

It can be seen that the two sections 1 and 2, comprising the housing, may be easily uncoupled, the handles 10 aiding in this operation. The packing units are consequently easily inserted or renewed and the relative position of the spring 30 with respect to the sections making up the housing, is such that it too may be readily renewed if required.

As when pumping oil, when the member F is on the upstroke, the packing unit in the section 1 will be carried upwardly by the member F and will be, consequently, tightly compressed, packing off the fluid from the end 3 of the section 1. Upon the down stroke, the packing unit in the lower section 2 will be carried downwardly by the member F and will be tightly compressed, packing off the fluid at the end 3 of the section 2, while the abnormal compression upon the packing unit in the section 1 will be relieved. The next upstroke will relieve the abnormal pressure upon the packing unit in the section 2 and a very small volume of the fluid being pumped will be carried between the side walls of the packing unit and the walls of the section into the chamber 25 from the chamber 24. Release of the compression upon the packing unit in section 1, on the down stroke, will cause a minute volume of the fluid to enter, as required, the chamber 26 from the chamber 25 in the same way. It will be seen that as the polished rod reciprocates, pressure will be alternately relieved and applied to each packing unit in a non-synchronous relation, one with the other. It is apparent that since the inner surface of the side walls of one chamber merges into the other and the packing units C are spaced from the end walls 4, as the reciprocating packing units wear away at their peripheries they, being frusto-conical, will be urged by the spring 30 toward these ends but will still provide a tight seal over the extent of their peripheries and the abutting wall surface of the chambers.

The compressibility of the packing and the resilient means D, will prevent any obnormal hydrostatic pressure to develop in any of the three chambers. Lubricant will well coat the reciprocating polished rod and any surplus carried on the rod thru the aperture 6 in the section 1 will flow into the sump 9.

Material worn from the packing units will be caught in the chambers, particularly the chamber 24, and will not enter the well tubing.

An abnormal gas pressure developed in the well and imparted to the fluid will not render the stuffing box inoperative, for the upper packing unit will function even if it does not reciprocate and will be held tightly compressed against the walls of the housing for packing off.

It will be noted that the reciprocating member F cannot slap against the walls 4 of the housing B, since the former is retained with its axis in substantial alignment with that of the housing by whichever packing unit C is under compression.

The chambers containing the oil are of sufficient size to retain enough lubricant, so that if the well should cease pumping for a few minutes, the packing will not be damaged, thus eliminating the need of frequent checking and tightening of the packing glands, as in ordinary construction.

Various changes may be made to the form of invention herein shown and described, without departing from the spirit of the invention or the scope of the claims.

What is claimed is:

1. In a stuffing box for a reciprocating member, a housing provided with a pair of frusto-conical chambers open to each other at their larger ends and also provided with end walls, said walls having axially aligned apertures accommodating the reciprocating member, spaced apart frusto-conical packing members in each of said chambers and adapted to encircle said reciprocating members and each spaced from the inner surfaces of both of said end walls and resilient means between said packing members to return said packing members to their sealing positions after movement of said reciprocating member.

2. A stuffing box for a reciprocating member, comprising an elongate housing provided with a pair of frusto-conical chambers open to each other at their larger ends and with the sloping wall surfaces of one chamber merging into the sloping wall surfaces of the other chamber, said housing having end walls at the smaller ends of said chambers and each provided with an axially aligning aperture for accommodating said reciprocating member, the walls of both of said apertures clearing the periphery of said member, a frusto-conical packing unit of compressible material in each chamber encircling and reciprocable with said member, said units alternately contacting the side walls of their respective chambers, whereby said member is held spaced from the said end walls of the housing, and a resilient means between said packing units to return the same to their sealing positions after movement of said reciprocating member.

3. In a stuffing box for oil pumping equipment including a polished rod, an elongate stationary housing surrounding a portion of said rod and provided with end walls having polished rod-accommodating apertures and also provided with a pair of axially aligning, frusto-conical chambers disposed with said end walls forming end walls of said chambers, said chambers open to each other at their larger ends, a frusto-conical packing unit of compressible material in each chamber, each unit spaced from the other and encircling and reciprocable with said rod and each disposed with both of its end faces spaced substantially a like distance from the inner surfaces of the ends of its chamber, whereby chambers are provided between the smaller face of each packing unit and each end wall of said housing, for receiving a minute volume of the oil being pumped, and resilient means disposed between said packing units to return said units to their sealing positions after movement of said rod.

4. A stuffing box for oil pumping equipment including a polished rod, comprising a pair of hollow, frusto-conical housing sections detachably joined together at their larger ends and each provided with an axially aligned aperture at its smaller end for accommodating said rod, a like frusto-conical packing member disposed in each section, said members spaced from each other adapted to encircle said rod and reciprocate therewith, each of said members having a portion of its surface normally in contact with the interior surfaces of said section and with both of its end faces spaced from the smaller ends of said housing sections intermediate the ends of said section, and resilient means disposed between and bearing against said packing members, whereby expansible and contractible chambers are provided between the smaller ends of said sections and said packing members and between said pair of packing members, for receiving a minute portion of the oil being pumped, for utilization as a lubricant for said polished rod.

5. A stuffing box for oil pumping equipment including a polished rod and a support, comprising an elongate housing having means for securing said housing to said support, said housing having end walls provided with apertures for accommodating said rod and having side walls extending inwardly from substantially midway of its length towards said end walls, a pair of spaced apart axially aligning packing units disposed within said housing with their outer peripheries normally in contact with the interior surfaces of the side walls of said housing and with all of their end faces out of contact with the inner surfaces of said end walls of said housing, and means to retain said packing units spaced apart one from the other and normally in contact with the side walls of said housing.

ROY HERBERT MILLER.